(12) United States Patent
Lin

(10) Patent No.: US 8,027,583 B2
(45) Date of Patent: Sep. 27, 2011

(54) WAVELENGTH DIVISION MULTIPLEXED SYSTEMS WITH OPTICAL PERFORMANCE MONITORS

(75) Inventor: Christopher Lin, El Cerrito, CA (US)

(73) Assignee: Oclaro (North America), Inc., San Jose, CA (US)

( * ) Notice: Subject to any disclaimer, the term of this patent is extended or adjusted under 35 U.S.C. 154(b) by 551 days.

(21) Appl. No.: 12/313,584

(22) Filed: Nov. 21, 2008

(65) Prior Publication Data

US 2010/0129071 A1     May 27, 2010

(51) Int. Cl.
*H04B 10/08* (2006.01)
(52) U.S. Cl. .................. 398/9; 398/13; 398/33; 398/85
(58) Field of Classification Search ............... 398/9, 13, 398/33
See application file for complete search history.

(56) References Cited

U.S. PATENT DOCUMENTS

| | | | | |
|---|---|---|---|---|
| 6,111,503 A | * | 8/2000 | Javitt et al. | 340/552 |
| 6,922,529 B2 | * | 7/2005 | Bortz et al. | 398/5 |
| 2004/0160596 A1 | * | 8/2004 | He et al. | 356/73.1 |

* cited by examiner

*Primary Examiner* — Dung Nguyen
(74) *Attorney, Agent, or Firm* — Patterson & Sheridan, L.L.P.

(57) ABSTRACT

The specification describes optical performance monitors which are simplified by coupling single tunable optical filters to multiple channels being monitored. Optical measurements for more than one channel may be made simultaneously. The optical system architecture is preferably an optical performance monitor for a WDM system. In a system designed according to the invention n channels may be monitored using n photodetectors, n optical splitters, but only n/2 tunable optical filters. Additional system simplification may be obtained using optical switching elements coupled to the optical splitters.

16 Claims, 4 Drawing Sheets

WAVELENGTH DIVISION MULTIPLEXED SYSTEMS WITH OPTICAL PERFORMANCE MONITORS

FIELD OF THE INVENTION

The invention relates to improvements in optical systems based on tunable optical filters.

BACKGROUND OF THE INVENTION

There exists a well known category of optical devices that perform optical filtering and can be tuned to select a narrow band of wavelengths from a wider wavelength spectrum. These devices are used in a variety of optical systems. Of specific interest are wavelength division multiplexed systems that operate typically over wavelength bands of tens of nanometers. These systems require optical performance monitoring (OPM) to ensure that signal power, signal wavelength, and signal to noise ratios (OSNR) are within specified limits. Other applications for tunable optical filters, inter alia, are for optical noise filtering, noise suppression, and wavelength division multiplexing.

For the purpose of describing this invention the focus will be OPM systems, more specifically, OPM systems for wavelength division multiplexed (WDM) systems. It will be understood that the invention is not so limited.

In WDM systems, basic system design assumes wavelength stability. However, a variety of dynamic changes occur due to temperature changes, component aging, electrical power variations, etc. For optimum system performance it is necessary to monitor these changes and adjust system parameters to account for them. To accomplish this, optical channel monitors (OCMs), also known as optical performance monitors (OPMs), may be used to measure critical information for the various channels in the WDM system. OPMs may monitor signal dynamics, determine system functionality, identify performance change, etc. In each case they typically provide feedback for controlling network elements to optimize operational performance. More specifically, these tunable optical filters scan the C-, L- and/or C+L-band wavelength range and precisely measure channel wavelength, power, and optical signal-to-noise ratio (OSNR).

Performance parameters for tunable optical filters are likewise important for the effectiveness of OPMs. These include adjacent channel isolation and non-adjacent channel isolation. Adjacent channel isolation is the difference between the minimum point in the pass channel and the maximum point in the adjacent channels over all relevant polarization states and over the temperature range of the specification. Non-adjacent channel isolation is the difference between the minimum point in the pass channel and the maximum point of non-adjacent channels. It is also useful for tunable optical filters used in these monitors to have very narrow bandwidth. That produces more information as the signal band is scanned by the tunable optical filter. On the other hand, for measuring optical power in a selected channel over a wider bandwidth, a tunable filter with a correspondingly wider bandwidth makes that measurement simpler. This is among several trade-offs encountered in OPM design. There is also the ubiquitous trade-off of cost.

In a multichannel system, the monitor for each channel has several operating elements. Recognizing that each of these elements are multiplied many times over in assessing the overall system cost, an apparently small cost efficiency in the design of the monitor is likewise multiplied to reach the overall cost impact. In some cases increasing the complexity of the monitors by adding elements may result in a system cost reduction depending on the relative costs of the elements.

SUMMARY OF THE INVENTION

I have designed a cost effective tunable optical filter system for OPM in which individual tunable optical filter elements are used to monitor more than one channel.

BRIEF DESCRIPTION OF THE DRAWING

The description of the invention below may be more easily understood when considered in conjunction with the drawing, in which.

DETAILED DESCRIPTION

Figure 1:
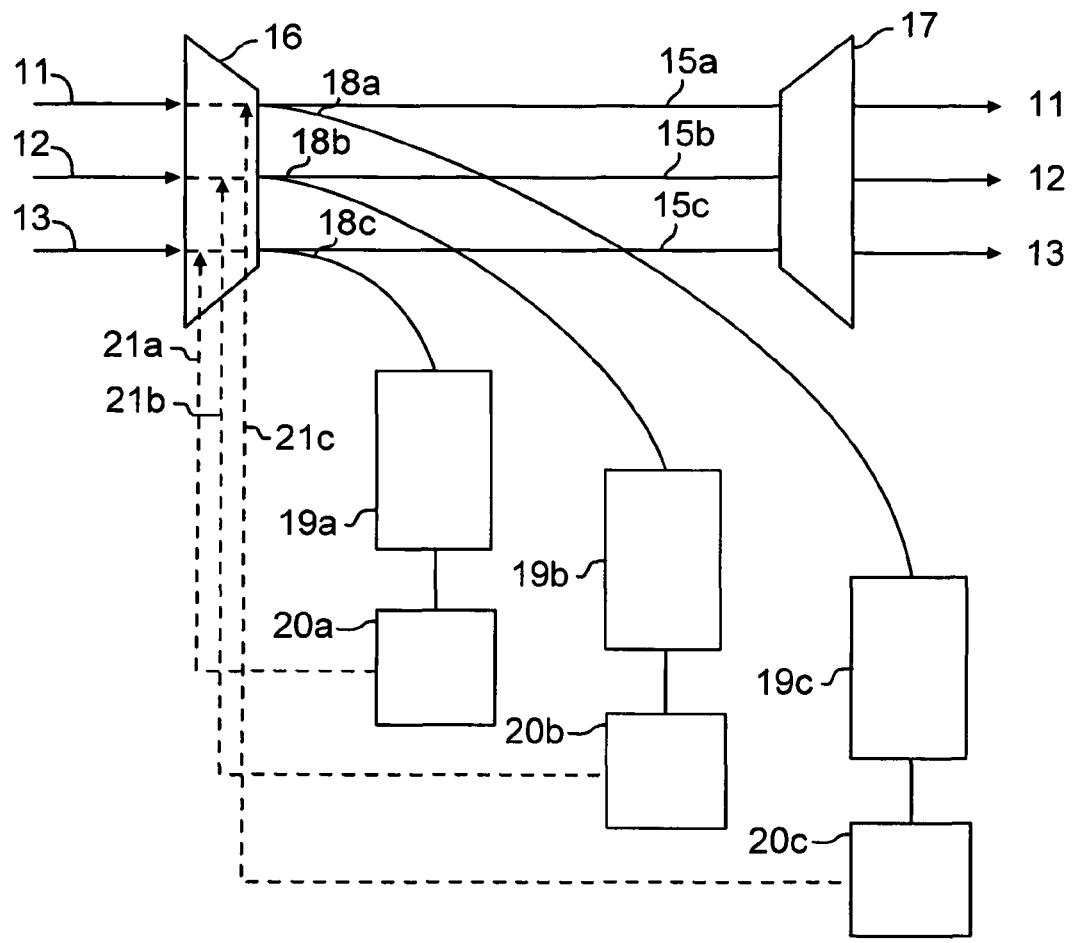
FIG. 1 is a schematic representation of a conventional WDM/OPM system wherein each WDM channel is monitored using a tunable optical filter.

With reference to FIG. 1, a conventional approach to OPM in a WDM system is illustrated. As mentioned earlier, the description of the invention is focused on WDM systems as but one example of an application in which tunable optical filters are used for OPM, and the use of the invention to analyze and correct for wavelength drift etc. in the respective channels of the WDM system. For simplicity, FIG. 1 shows three channels 11, 12, and 13. However, it is understood that typical WDM systems may have many more channels. FIG. 1 shows transmission lines 15a, 15b, and 15c between multiplexer 16 at a sending site and demultiplexer 17 at the receiver. In one embodiment of OPM, the multiplexed signals are tapped, via taps 18a, 18b and 18c, and the tapped signals are optically coupled to tunable optical filters 19a, 19b and 19c, for analysis of the WDM signal in each channel, and detection of channel degradation. The tunable optical filters may sweep across selected wavelengths near the specified channel wavelength, or they may sweep across the WDM band. The output of the tunable optical filters reveals, for example, power changes in the individual channels of the signal. The power spectrum is measured by photodiodes 20a, 20b, and 20c. Results are fed back via feedback loops 21a, 21b, and 21c to the input stage for adjusting signal parameters of the individual channels to correct errors.

Figure 2:
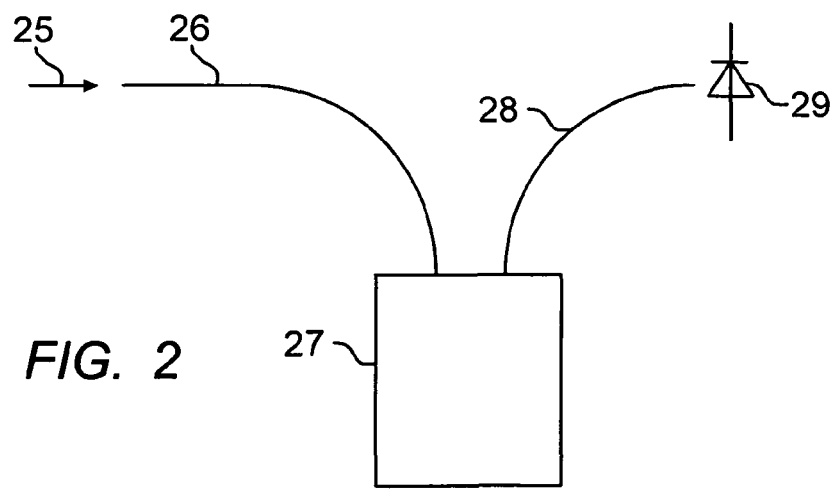
FIG. 2 is a schematic view of the basic elements in the WDM/OPM system of FIG. 1.

A generalized schematic of the tunable optical filter/detector subassembly is represented by FIG. 2, where the tapped signal 25 is conducted via optical fiber link 26 to tunable optical filter 27. The filtered signal is conducted via optical fiber link 28 to the detector. In the embodiment shown the detector 29 is a photodiode. The detector may comprise other known means for measuring the properties of the filtered light signal.

Figure 3:
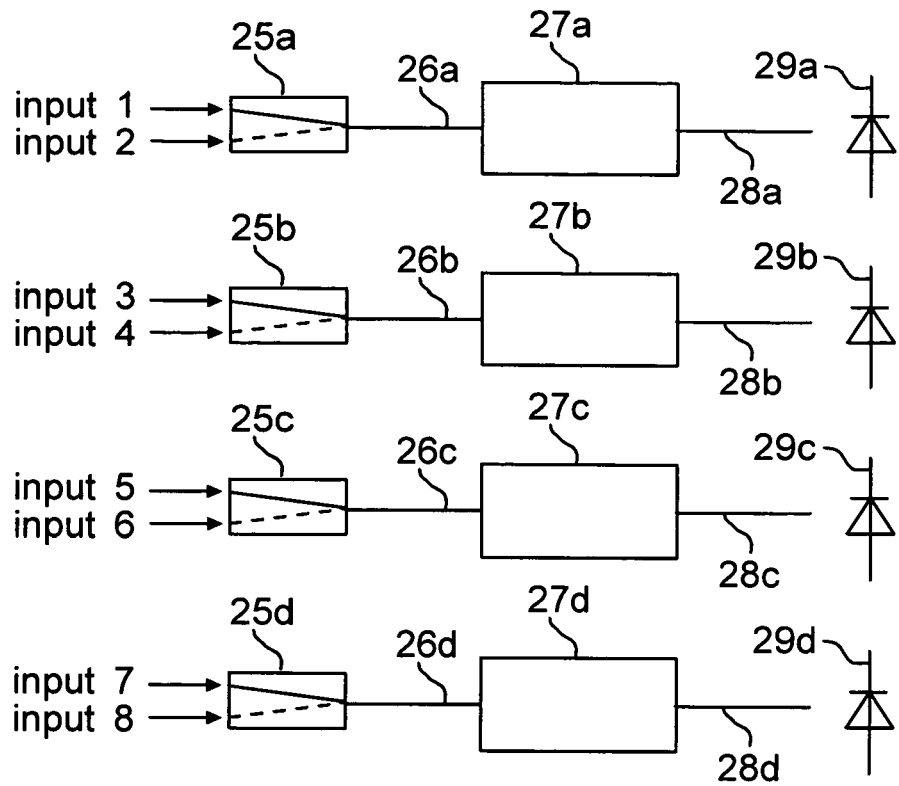
FIG. 3 is a schematic similar to that of FIG. 1 of a prior art system wherein each tunable optical filter is used to monitor more than one WDM channel.

It has been recognized that economies in the OPM system may be realized by using the tunable optical filters for more than one channel in the WDM system. A known approach for doing this is represented in FIG. 3, where the OPM system monitors eight channels, inputs 1-8, using only 4 tunable filters 27a-27d. Inputs 1 and 2, for example, are coupled to a one-by-two optical switch 25a. The output of the switch is coupled via waveguide 26a to tunable optical filter 27a and the optical power output, for example, from the tunable optical filter is coupled via waveguide 28a to photodiode 29a. With the switches 25a-25d in the position shown, inputs 1, 3, 5, and 7 may be monitored. By switching optical switches 25a-25d, inputs 2, 4, 6, and 8 may be monitored. In each case the tunable optical filters are swept across the wavelength bands being monitored. It may be as convenient to sweep the tunable optical filters across the entire WDM band. However, some economies may result from using tunable optical filters with tuning ranges less than the entire WDM band, and tailored to a smaller band that includes the channel wavelengths being monitored. The system in FIG. 3, compared with that in FIG. 1, requires half the number of photodiodes, and half the number of tunable optical filters, but adds four one-by-two optical switches. Note that in this system all eight channels cannot be monitored simultaneously, as with a system constructed of OPM units represented in FIG. 1, where each channel OPM has a dedicated tunable optical filter.

Figure 4:
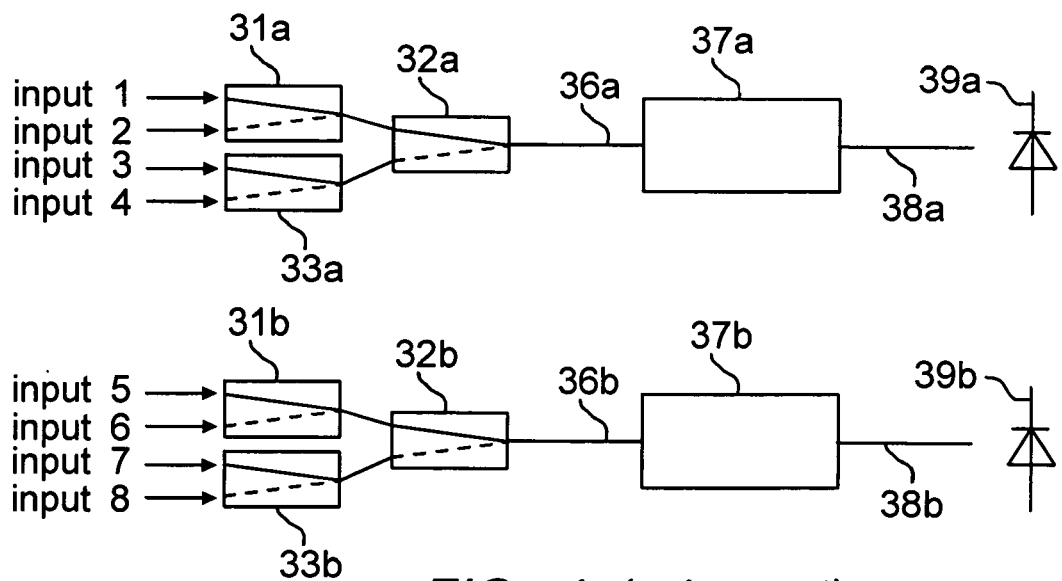
FIG. 4 is a schematic representation of an alternative arrangement to that shown in FIG. 3.

A modification of the system of FIG. 3 is represented in FIG. 4, where eight inputs are monitored using two four-by-one optical switches that comprise switching elements 31a, 32a, 33a, and 31b, 32b, and 33b. In this system, the number of tunable optical filters and the number of photodetectors is again reduced, with a corresponding addition of two optical switches. For example, comparing the systems represented by FIGS. 3 and 4, the system monitoring eight channels based on modules represented in FIG. 4 requires two tunable optical filters, two photodetectors, and six one-by-two optical switches, compared with four tunable optical filters, four photodetectors, and four one-by-two optical switches for the OPM system of FIG. 3. Note again that the switching matrix for the OPM system of FIG. 4 has four separate switching states, meaning that only two of eight channels can be monitored simultaneously.

Figure 5:
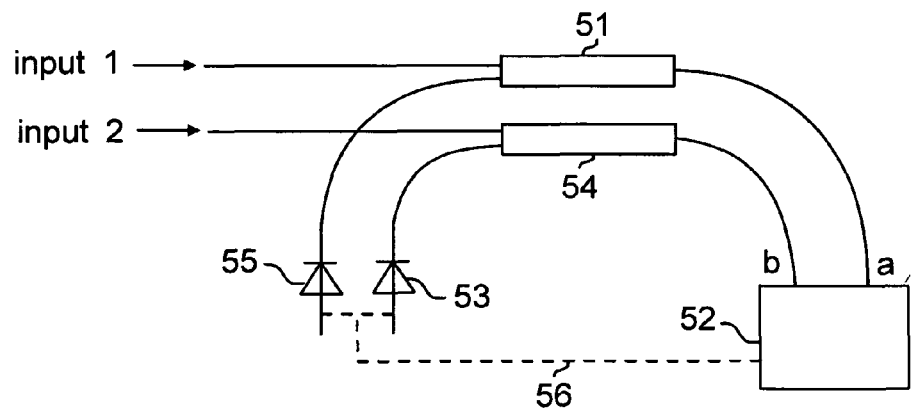
FIG. 5 is a schematic representation of a first embodiment of the invention wherein tunable optical filters perform dual use.

A more useful and cost effective approach is shown in FIG. 5, a preferred embodiment of the invention. In the OPM of FIG. 5, two inputs, input 1 and input 2, are monitored by directing the inputs each through an optical splitter 51, 54, then both are directed through tunable optical filter 52, then back through the splitters. Light from input 1 is coupled through splitter 51 to the input "a" of tunable optical filter 52 and exits from output "b". Output "b" is coupled back through splitter 54 to photodetector 53. Light from input 2 is coupled through splitter 54 to the input "b" of tunable optical filter 52 and exits from output "a". Output "a" is coupled back through splitter 51 to photodetector 55. The tunable optical filter 52 effectively has two inputs and two outputs. In both cases, light from an input will arrive at both photodetectors. The light in the selected band is measured for the monitoring function. Light from the other band is "noise" and is ignored.

In the OPM system of FIG. 5, two channels, i.e. input 1 and input 2, may be monitored using two splitters, two photodetectors and one tunable optical filter. In the OPM system represented by FIG. 3, two channels are monitored by units each having one tunable filter, one photodiode, and one one-by-two optical switch. It would appear that the units in the OPM system of FIG. 5 are more complex than the corresponding units of FIG. 3, requiring five optical elements instead of four. But there are two important advantages of the system of FIG. 5 over the system represented in FIG. 3. One, while there is an added element in each unit, the combined cost of the five elements in the two channel monitor of FIG. 5 is still substantially less than the cost of the four optical elements for the two channel monitor of FIG. 3. This is due partly to the high cost of the one-by-two switch element, e.g., 25a in FIG. 3. The second advantage is an important operational one. With the OPM represented by FIG. 5, both channels in each unit may be monitored simultaneously.

For simultaneous monitoring of more than one channel, the wavelengths being swept by the tunable optical filter and the light being measured at the photodetector elements should be coordinated. This requires that the data acquisition from the photodetectors be synchronized with the tuning element of the tunable optical filter. The synchronizing loop is represented by 56 in FIG. 5.

The optical splitters described above may split the input signal in any suitable ratio. Typically the ratio will be approximately 50-50 but considerations may arise that favor other ratios.

A typical tunable optical filter is a reciprocal device with at least two ports. Thus port "a" in FIG. 5, normally the input port becomes an input/output port for the operation of the tunable optical filter in systems constructed according to the invention. Port "b" in FIG. 5, normally the output port, is also an input/output port.

It will be recognized that the optical splitter in the systems shown comprises a 1:2 optical splitter used backwards. Typically a 1:2 optical splitter is used to divide an optical signal that is fed to the input side of the optical splitter, i.e. the "one" side, with the two divided parts of the signal exiting the optical splitter on the "two" side. In the operation of the splitter according to the invention, the input signal is coupled to one of the waveguides on the "two" side. The return signal from the double pass tunable optical filter is coupled to the waveguide on the "one" side of the splitter and is directed to the photodetector through the second waveguide on the "two" side. Thus in the context of the arrangement of the invention the optical splitter has an input and an output on the "two" side, and an input/output on the "one" side, and is referred to here as a 2:1 optical splitter.

The splitter may be a fused optical fiber splitter, or other equivalent element performing this function. While a 2:1 optical splitter is shown here for this function, alternative coupling and/or routing elements may be used. For example, a 2:2 optical splitter could be used with an added output used to measure other parameters. Furthermore, a circulator could be substituted for the simple 2:1 splitter shown in FIG. 5. In this case, the input light enters the first port of the circulator, exits the second port, returns into the second port after passing through the tunable filter, and exits the third port, whereupon it is measured using the photodetector. Thus the circulator has two inputs and one output, equivalent to a simple one-by-two optical splitter. Both options are considered optical splitters or as functional equivalents for optical splitting. The optical splitters functioning in the systems of the invention characteristically have one port that serves as an input, another port that serves as an output, and a third port that serves as both an input and output. These devices can be referred to as "three port splitters". As indicated a three port splitter may have additional ports for added functionality.

Figure 6:
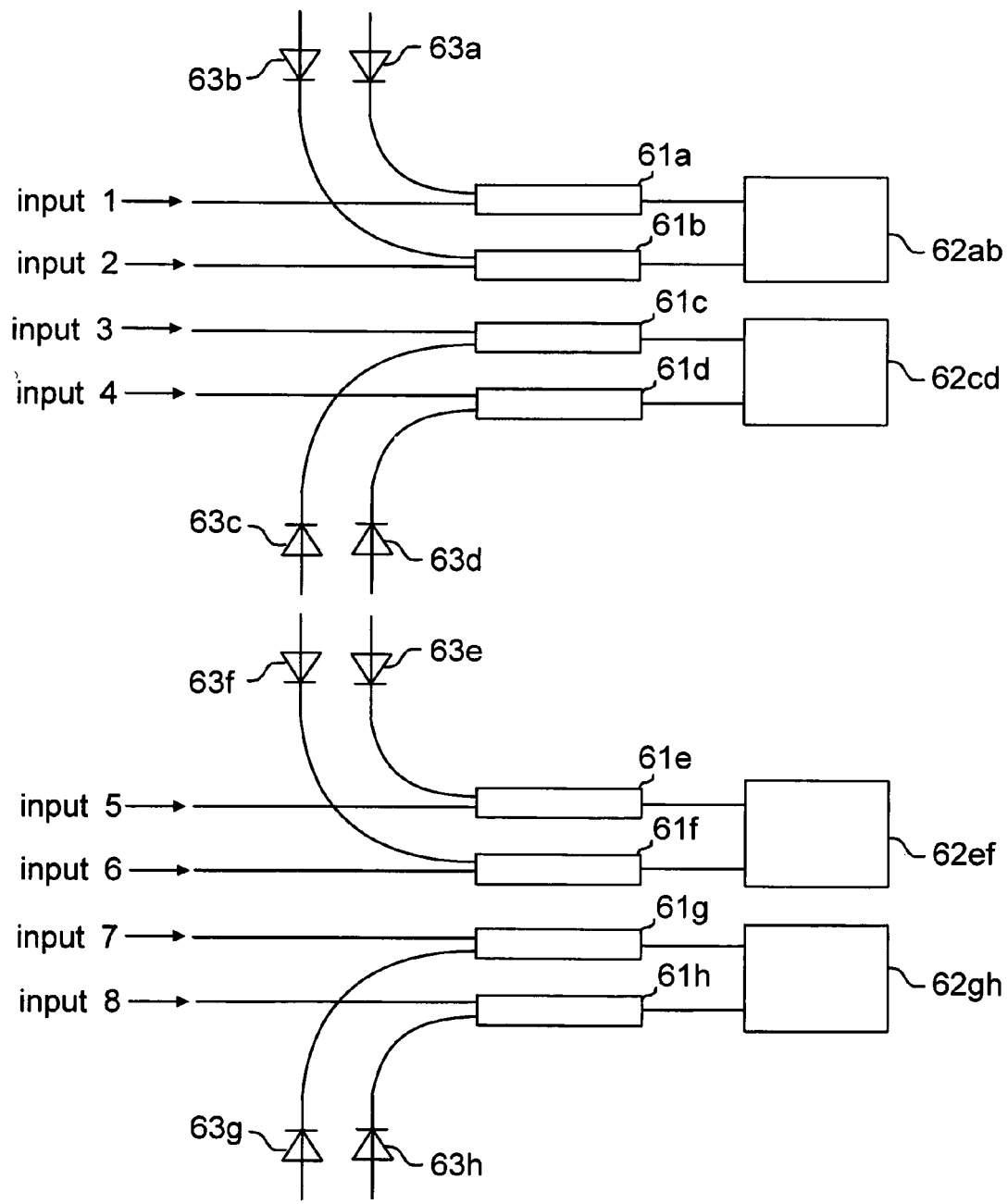
FIG. 6 shows an embodiment of the invention in which the unit shown in FIG. 5 is scaled to serve a multichannel system with eight inputs.

FIG. 6 shows a system with inputs 1-8 based on the module of FIG. 5. Each of the 1-8 inputs is coupled to the "two" side of a 2:1 splitter, i.e., splitters 61a-61h. The "one" sides of the eight splitters are coupled to tunable optical filters as shown. Each of the tunable optical filters serves two inputs. Tunable optical filter 62ab serves inputs 1, 2, tunable optical filter 62cd serves inputs 3, 4, tunable optical filter 62ef serves inputs 5, 6, and tunable optical filter 62gh serves inputs 7, 8. The other side of each of the splitters 61a-61h is coupled to a photodetector, i.e., photodiodes 63a-63h. Thus in this embodiment, eight channel OPM requires eight splitters and eight photodetectors, but only four tunable optical filters. For simplicity and clarity in FIG. 6, the synchronization between the photodetectors and the tunable optical filters is not shown.

The operation of these OPMs is as described in connection with FIG. 5. All eight channels represented by inputs 1-8 may be monitored simultaneously.

Figure 7:
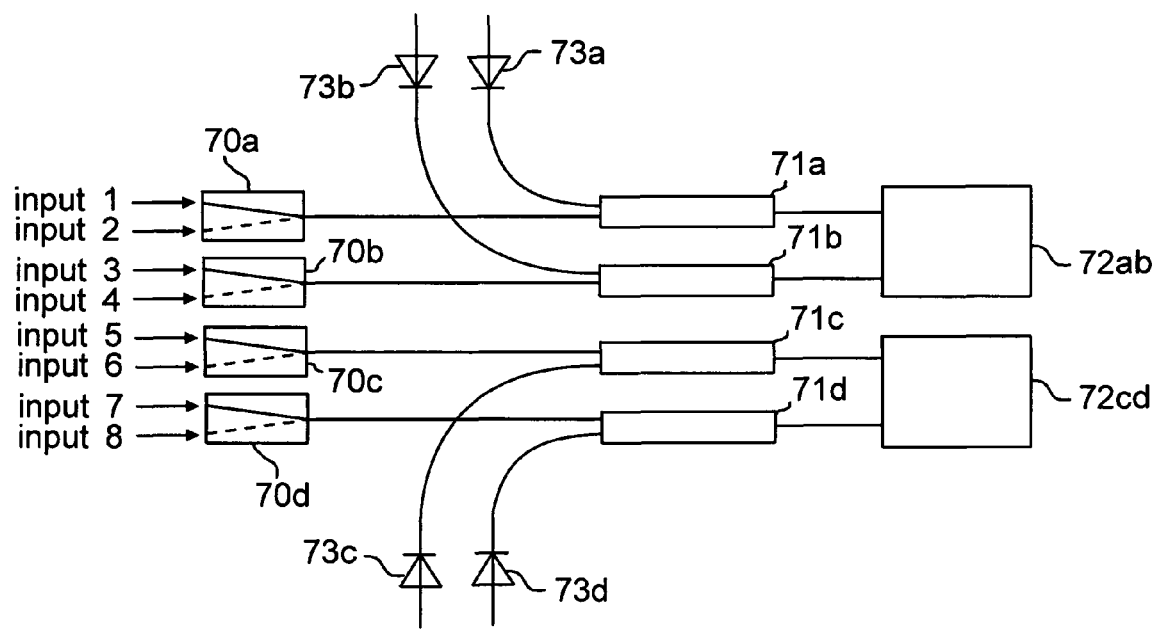
FIG. 7 shows an alternative embodiment of the invention using combinations of dual use tunable optical filters and optical switches.

Another embodiment showing OPM system simplification based on multiple inputs sharing tunable optical filters is shown in FIG. 7. This embodiment uses 1×2 optical switches 70a-70d in the manner shown in FIG. 3. It uses four optical splitters 71a-71d, and four photodetectors 73a-73d. However, in contrast with the OPM embodiment of FIG. 3, the embodiment of FIG. 7 has two fewer tunable optical filters. Tunable optical filter 72ab serves inputs 1-4 and tunable optical filter 72cd serves inputs 5-8. Only half of the inputs may be measured simultaneously.

The tunable optical filter may be one of a variety of designs. An example of this form of device is described in U.S. Pat. No. 5,917,626, issued Jun. 29, 1999. This tunable optical filter is based on controlling the distance between an input optical path and the axis of a GRIN lens, and using the lens to transmit the beam to an interference filter. The filter passes spectral components within the characteristic wavelength band and reflects spectral components outside the characteristic wavelength band. The pass and rejection bands of the filter can be easily tuned to form a tunable optical filter useful in WDM multiplexers and demultiplexers. The wavelength band varies with the angle of incidence of light to the normal direction to the filter. The filter has means for directing the optical signal along an input optical path substantially parallel to the axis of the GRIN lens at a distance from the axis, and adjusting the distance so that a spectral component in the first input optical signal transmitted by the lens is passed or reflected by the filter. More details on this device may be found in the cited patent, which is incorporated herein by reference.

Another suitable category of tunable optical filters is MEMS filters. An example of this type of tunable optical filter is described in U.S. Pat. No. 6,373,632, issued Apr. 16, 2002, also incorporated herein by reference. More information on this category of devices is available through:

http://www.axsun.com/html/products_omx_telecom.htm

Several known tunable optical filter designs include a photodetector element integrated with the tunable optical filter. This physically restricts access to the tunable optical filter in such a way as may prevent a convenient means for sharing the tunable optical filter between multiple inputs as described above. In most such cases it is only necessary, in order to implement this invention, to disintegrate the tunable optical filter and the photodetector and couple the output to one of the multiple inputs.

In general, a tunable optical filter is an optical filter that can be tuned over a wavelength range of at least 10 nm. A typical tunable optical filter will filter an input optical band of, for example 1550 nm to 1580 nm, to channels of one or a few nm over that optical band. Tuning may be effected by changing an electrical operating parameter of the tunable optical filter (e.g. voltage or current), by mechanically changing the physical structure of the device, by heating or cooling the device, etc.

In the preferred embodiment, the optical signals that are delivered to the input port of the tunable optical filter are signals tapped from the WDM system being monitored. The tapped WDM signal may be modulated, i.e. tapped after the modulator, or unmodulated, i.e. tapped before the modulator.

In the preferred embodiments of the invention the OPM is implemented using optical fiber assemblies and components. However, one or more elements and steps of the OPM system and method may involve other forms of waveguides. For example, an optical integrated circuit may be used to route the optical signals through the tunable optical filter.

The term "coupled" in the context of the invention means optically coupled in any suitable manner.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. Method for optically monitoring multiple channels comprising:
   a) coupling a first optical channel to the input port of a first three port optical splitter,
   b) coupling a second optical channel to the input port of a second three port optical splitter,
   b) coupling the input/output port of the first three port splitter to a first input/output port of a tunable optical filter,
   c) coupling a second input/output port of the tunable optical filter to the input/output port of the second three port optical splitter,
   d) coupling the output port of the first three port splitter to a first photodetector,
   e) coupling the output port of the second three port splitter to a second photodetector,
   f) scanning the tunable optical filter, and
   g) measuring the output of the first and second photodetectors.

2. The method of claim 1 wherein the output of the first and second photodetectors are measured simultaneously.

3. The method of claim 1 wherein the photodetectors are photodiodes.

4. The method of claim 1 wherein the optical splitters comprise 2:1 optical splitters.

5. The method of claim 1 wherein the optical splitters comprise optical circulators.

6. The method of claim 1 wherein one or more of the optical channels are switched before being coupled to the optical splitter.

7. The method of claim 1 wherein the multiple channels being monitored are channels of a WDM optical system and the method additionally includes the step of producing the first and second optical signals by tapping an optical signal from the WDM system.

8. The method of claim 1 wherein steps f) and g) are synchronized.

9. Optical device comprising:
   a) a first three port optical splitter,
   b) a first optical channel coupled to the input port of the three port optical splitter,
   c) a second three port optical splitter,
   d) a second optical channel coupled to the input port of the second three port optical splitter, e) a tunable optical filter having first and second input/output ports, f) a waveguide coupling the input/output port of the first three port splitter to the first input/output port of the tunable optical filter, g) a waveguide coupling the second input/output port of the tunable optical filter to the input/output port of the second three port optical splitter, h) a waveguide coupling the output port of the first three port splitter to a first photodetector, j) a waveguide coupling the output port of the second three port splitter to a second photodetector.

10. The device of claim 9 wherein the optical splitters comprise 2:1 optical splitters.

11. The device of claim 9 wherein the optical splitters comprise optical circulators.

12. The device of claim 9 wherein the photodetectors are photodiodes.

13. The device of claim 9 with synchronizing means synchronizing the first and second photodetectors and the tunable optical filter.

14. The device of claim 9 further including optical switching devices coupled to the three port optical splitters for switching one or more channels coupled to the optical splitters.

15. A WDM system with multiple optical performance monitors wherein the optical performance monitors comprise:

a) a first three port optical splitter, b) a first optical channel coupled to the input port of the three port optical splitter, c) a second three port optical splitter, d) a second optical channel coupled to the input port of the second three port optical splitter, e) a tunable optical filter having first and second input/output ports, f) a waveguide coupling the input/output port of the first three port splitter to the first input/output port of the tunable optical filter, g) a waveguide coupling the second input/output port of the tunable optical filter to the input/output port of the second three port optical splitter, h) a waveguide coupling the output port of the first three port splitter to a first photodetector, j) a waveguide coupling the output port of the second three port splitter to a second photodetector.

16. The WDM system of claim 15 for monitoring n channels wherein the system has n photodetectors, n three port splitters, and n/2 tunable optical filters.

* * * * *